May 16, 1967 A. WAGSTAFFE ETAL 3,320,428
PHOTOSENSITIVE APPARATUS FOR DETECTING SOLID PARTICLES
SUSPENDED IN LIQUID
Filed April 15, 1964 2 Sheets-Sheet 2
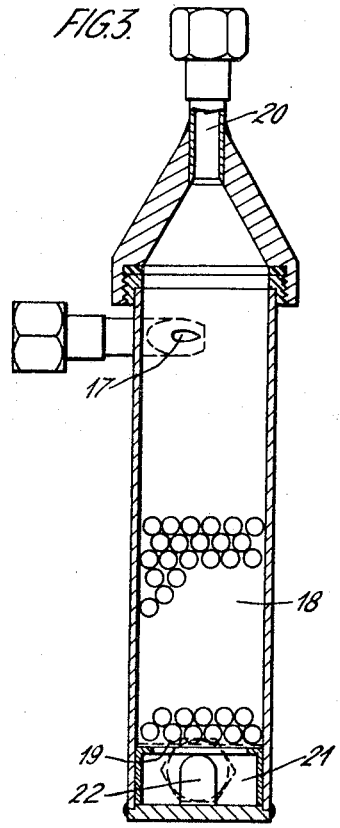
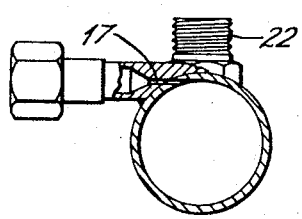
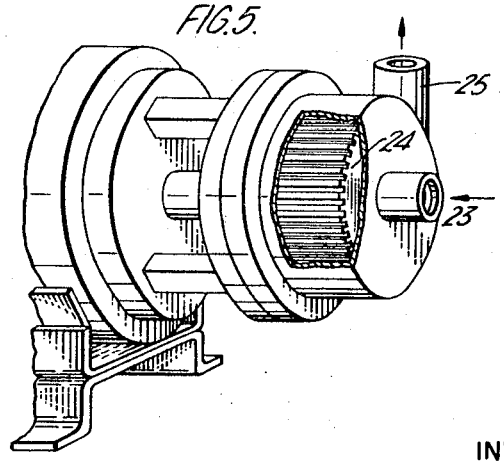
INVENTORS
ALAN WAGSTAFFE
DAVID JOHN CHARNOCK
LESLIE RAYMOND BEYNON
BY
MORGAN, FINNEGAN, DURHAM & PINE
ATTORNEYS

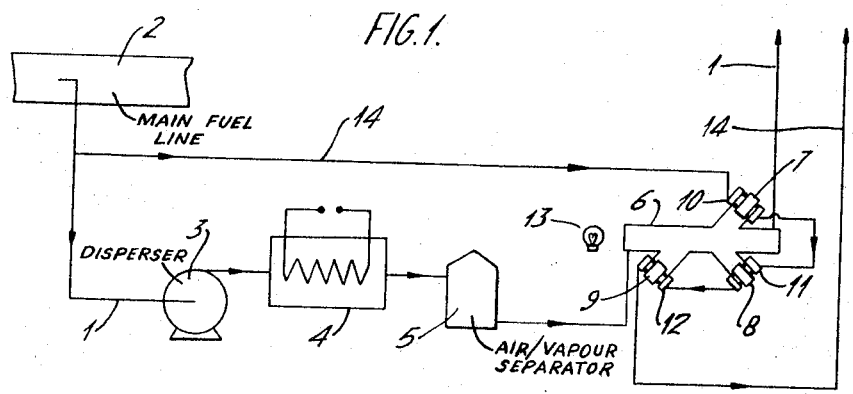
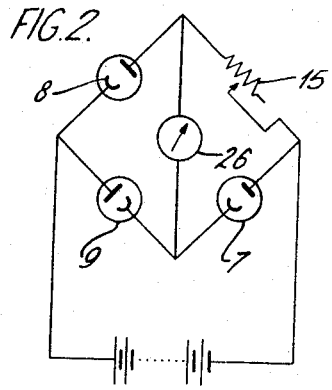
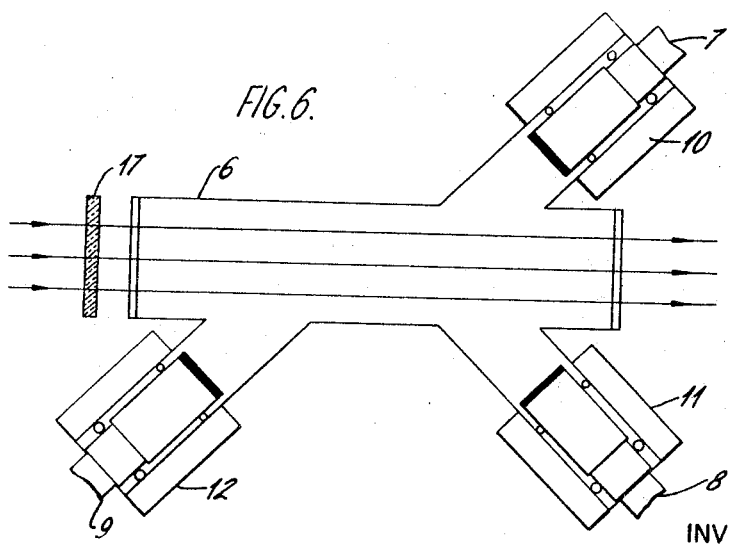

United States Patent Office 3,320,428
Patented May 16, 1967

3,320,428
PHOTOSENSITIVE APPARATUS FOR DETECTING SOLID PARTICLES SUSPENDED IN LIQUID
Alan Wagstaffe, David John Charnock, and Leslie Raymond Beynon, all of Sunbury-on-Thames, Middlesex, England, assignors to The British Petroleum Company Limited, London, England, a company of England
Filed Apr. 15, 1964, Ser. No. 359,930
Claims priority, application Great Britain, May 6, 1963, 17,775/63
8 Claims. (Cl. 250—218)

This invention relates to the detection of solid particles suspended in liquid, particularly in liquid hydrocarbons, especially aviation fuels for example aviation kerosines.

The objections to the presence of solid particles in aviation fuels are obvious and well known and it is desirable to test, continuously, fuel being loaded to aircraft for the presence of solid material.

According to the present invention an apparatus for detecting minor amounts of solid material suspended in a liquid comprises a line for the material to be tested leading through a light scattering enclosure, a source of light adapted to pass a beam of light through the scattering enclosure and means for measuring the light scattered in the enclosure, these means including at least three photo-electric cells attached to the light scattering enclosure but out of the direct path of the light beam.

The source of light is preferably arranged so as to provide a parallel beam of light in the light scattering enclosure. In this manner the direct incidence of light onto the photo-electric cells can be readily avoided.

In a method for detecting and measuring the presence of any solid contaminant in a liquid by the light scattering principle one major problem to be overcome is the inaccuracies caused by variations in the composition, and therefore the reflectivity, of the contaminant. In the apparatus of the present invention the photo-electric cells are arranged at suitable angles to the beam of light passing through the light-scattering enclosure so that by taking the ratio of the outputs of two of the cells, it is possible to compensate for the effect of changing reflectivity of solid contaminant on the output of the third photo-electric cell. This is possible because, in general, for a contaminant having a particular reflectivity, different amounts of light will be scattered at different angles in the scattering enclosure and the ratio of the amounts of light scattered at the two angles will be a function of the reflectivity.

Suitable angles for the compensating cells may, for example, be 135° and 45° and for the third cell 135°, the angle in each case being the one nearer the source of light and between the direction of the parallel light beam and the direction of light scattered from the beam and incident normally onto the surface of the particular photo-electric cell considered.

For example, it has been found empirically that the resistance of a photo-electric cell placed at 135° to the light beam is given by the equation:

$$r_{135} = \frac{1}{KRA} \quad (i)$$

where $r_{135}$ is the resistance of the cell
K is a constant
R is the reflectivity of the solid contaminant in the enclosure
A is the surface area of the solid contaminant in the enclosure.

A further empirical relationship has been found between the resistance of a photo-electric cell placed at 45° to the light beam ($r_{45}$) and that of the above cell ($r_{135}$) and the reflectivity (R) as follows:

$$\frac{r_{135}}{r_{45}} = K'R \quad (ii)$$

By plotting $r_{135}/r_{45}$ against R a straight line was obtained through the origin.

Multiplying (i) and (ii) gives i.e.
$$\frac{(r_{135})^2}{r_{44}} = \frac{KA}{K'}$$

$$\frac{r_{45}}{(r_{135})^2} = \frac{KA}{K'}$$

or K″A where $$K'' = \frac{K}{K'}$$

Thus $r_{45}/(r_{135})^2$ is a measure of the surface area, i.e. quantity, of contaminant in the scattering enclosure. Variations in the reflectivity of the contaminant will not effect the measurement of this quantity. This quantity can be measured by arranging the three photo-electric cells togther with a variable resistance in the form of an electrical bridge circuit.

The invention is particularly suitable for detecting the presence of solid material in a hydrocarbon or hydrocarbon mixture, for example an aviation fuel and in particular an aviation kerosine.

Aviation fuel, in addition to suspend solid contaminants, may also contain small quantities of suspended liquid contaminants, particularly water. The presence of suspended liquid material will have a considerable effect on the light scattered and will give a false estimate of solid contaminant.

In a preferred embodiment of the present invention the apparatus includes means for eliminating the presence of any suspended liquid particles in the material to be tested, said means comprising a heater located in the line prior to the light scattering enclosure.

The effect of any suspended liquid is eradicated by heating the sample to be tested to a temperature at which all the suspended liquid is dissolved, the dissolved liquid having no effect on the light scattering. Solid material may be detected in a liquid containing suspended liquid in an amount which is limited by the solubility of the suspended liquid at the temperature at which appreciable vaporisation of the lower boiling liquid commences.

In the case of aviation kerosine containing suspended water, solid material may be detected where the water is present in an amount of up to 500 parts of suspended water per million parts of fuel.

Any convenient type of heater may be used, for example an electrical immersion heater or a jacket type heated by electricity or by a suitable liquid. The capacity of the heater may vary depending on the purpose for which the apparatus is used and the throughput of the apparatus, but for the preferred use for detecting solid material in hydrocarbon fuels it should be capable of raising the temperature of the fuel sample to about 80° C.

In a further preferred embodiment the apparatus includes an air/vapor separator located in the line between the heater and the light scattering enclosure. By passing the material through the air/vapour separator any vapour and or air bubbles which could affect the light scattering are removed.

The apparatus preferably includes means for cooling the photo-electric cells, for example jackets surrounding the cells through which a cooling fluid may be passed. The cooling fluid may conveniently be a non-heated portion of the material to be tested which is passed to the jackets through a line starting at the point in the sample line prior to the heater.

The apparatus may include a suitable disperser situated prior to the heater to break down the suspended liquid particles so as to facilitate solution during the heating stage. A suitable form of disperser comprises a disc having a serrated edge rotatable inside a casing, the clearance between the serrated edge and the casing being adjusted to give the required suspended liquid particle size. Such a disperser may, for example, comprise a centrifugal pump, the impeller of which is replaced by a disc having a serrated edge, the clearance between the edge of the disc and the pump casing being adjusted to give the required suspended liquid particle size. The apparatus may also include suitable valves as required for operating the instrument and may also include a pressure indicator. The rate of flow of the liquid to be tested through the indicator may conveniently be controlled by operating a suitable valve in conjunction with a pressure gauge situated downstream from the valve.

An electrical circuit with an associated indicator may conveniently be used to measure the light scattered in the light scattering enclosure, and the circuit may include an alarm system. The alarm system may operate an alarm light, a bell or other warning signal and may also be made to operate either a shutoff system or a bypass system to divert fuel from the aircraft should the presence of solid material be detected.

A colour filter is desirably included in the path of the light beam to compensate for any colour changes in the material under test or the light source. An interference filter operating in the orange-red wave-length range is particularly preferred as the photo-electric cells are particularly sensitive in this range.

The invention is illustrated and described with reference to the accompanying FIGURES 1 to 6.

FIGURE 1 is a schematic flow diagram indicating the passage of the liquid sample to be tested through the apparatus.

FIGURE 2 shows a suitable electrical circuit for measuring the light scattered.

FIGURE 3 is a vertical section through a suitable type of air/vapour separator.

FIGURE 4 is a plan view of the air/vapour separator of FIGURE 3.

FIGURE 5 is a perspective view, partially broken away, of a suitable dispenser.

FIGURE 6 is a schematic diagram of part of a suitable optical system and the light scattering enclosure.

In FIGURE 1, in an aircraft fuel loading system a sample line 1 leads from the main fuel to aircraft line 2 through disperser 3, heater 4, air/vapour separator 5 through light scattering enclosure 6 to waste. Photo-electric cells 7, 8 and 9 are attached to light scattering enclosure 6 as shown, and are surrounded by cooling jackets 10, 11 and 12 respectively. A light source is indicated generally at 13. Line 14 leads from a point in sample line 1 prior to disperser 3 through cooling jackets 10, 11 and 12 to waste. Photo-electric cells 7, 8, and 9 are connected to an electrical bridge circuit of the type illustrated in FIGURE 2.

In FIGURE 2 the photo-electric cells form three arms of a Wheatstone bridge circuit, the fourth arm being rheostat 15 and the bridge arm having meter 26. The circuit may also incorporate an alarm relay (not shown) which may be set to operate should the presence of solid material be detected.

In FIGURE 6, the light scattering enclosure is indicated in greater schematic detail together with light filter 17.

Fuel passing along the sample line 1 passes through disperser 3 where any suspended liquid particles are broken down to a uniform particle size range, the sample then passing through heater 4. As the solubility of water in aviation fuel increases appreciable with temperature, any free water present is dissolved and fuel, free of suspended water, passes into air/vapour separator 5 where air and vapour bubbles are removed and thence into light scattering enclosure 6. Photo-electric cells 7, 8 and 9 are of the resistance changing type, and any solid particles present in the light scattering enclosure 6 will disperse the beam of light from source 13 and alter the resistance of the photo-electric cells 7, 8 and 9. Any alteration in the resistance of the photo-electric cells 7, 8 and 9 due to the presence of solid material will cause a deflection on the meter 26.

As shown in FIGURES 3 and 4 the material being tested is injected into the air/vapour separator via a jet 17 to form a vortex in the upper part of the separator. The vortex is broken by the layer of glass beads 18 which is supported on gauze 19. This layer also coalesces any air and vapour bubbles, the air and vapour being removed via line 20. The material being tested leaves the separator via free space 21 and line 22.

As shown in FIGURE 5 liquid to be tested enters the disperser via line 23, any suspended liquid being broken down by the rotation of serrated disc 24, the liquid to be tested then passing out of the disperser via line 25.

The instrument should be standardised periodically to eliminate the effect of gradual changes in the intensity of the light source, dirtiness of the light scattering enclosure or ageing of the photo-electric cells. This may be done, for example using a standard reflector as follows:

(1) Note reading of rheostat 15 when meter 26 is set to zero and when no fuel is flowing.

(2) Insert standard reflector (e.g. stainless steel rod) into the scattering cell.

(3) Set reading of rheostat 15 to initial reading + standard.

(4) Adjust intensity of light source so that meter 26 reads zero.

We claim:

1. An apparatus for detecting minor amounts of solid material suspended in a liquid, comprising a line for the liquid to be tested leading through a light scattering enclosure, means including a source of light for producing and passing a parallel beam of light through the scattering enclosure, and means for measuring the light scattered in said enclosure, said measuring means comprising three photo-electric cells attached to the light scattering enclosure but out of the direct path of said light beam, a first and second of said cells being disposed at angles of 135° and 45° respectively such that their outputs are employed to compensate for the effect of changing reflectivity of solid material on the output of the third photo-electric cell, the third cell being disposed at an angle of 135°, the angle in each case being the one nearer the source of light and between the direction of the parallel light beam and the direction of light scattered from the beam and incident normally onto the surface of the particular photo-electric cell considered.

2. An apparatus as claimed in claim 1 wherein a heater is located in the line prior to the light scattering enclosure.

3. An apparatus as claimed in claim 2 wherein an air/vapour separator is located in the line between the heater and the light scattering enclosure.

4. An apparatus as claimed in claim 2 wherein cooling means are provided for the photo-electric cells.

5. An apparatus as claimed in claim 4 wherein the cooling means comprise jackets surrounding the cells through which a cooling fluid may be passed.

6. An apparatus as claimed in claim 2 wherein a disperser is located in the line prior to the heater to break down any suspended liquid particles, the disperser comprising a disc having a serrated edge rotatable in a casing, the clearance between the serrated edge being adjusted to give the required suspended liquid particle size.

7. An apparatus as claimed in claim 1 wherein a colour filter operating in the orange-red wave length range is included in the path of the light beam before it enters the scattering enclosure.

8. An apparatus as claimed in claim 5 wherein the cooling fluid comprises a non-heated portion of the liquid to be tested.

References Cited by the Examiner

UNITED STATES PATENTS

| 2,873,644 | 2/1959 | Kremen et al. | 250—218 X |
| 3,111,837 | 11/1963 | Evans et al. | 73—53 |
| 3,138,650 | 6/1964 | Andrychuk et al. | 88—14 |
| 3,202,826 | 8/1965 | Greathouse | 250—218 |
| 3,234,846 | 2/1966 | Cropper et al. | 2—66 |

WALTER STOLWEIN, *Primary Examiner.*